(12) United States Patent
Petruccelli et al.

(10) Patent No.: US 7,383,190 B1
(45) Date of Patent: Jun. 3, 2008

(54) SYSTEMS, METHODS AND COMPUTER PROGRAM PRODUCTS FOR RECEIVING AND RESPONDING TO CUSTOMER REQUESTS FOR TRAVEL RELATED INFORMATION

(75) Inventors: Charles Petruccelli, Herbeville (FR); Julia Scharankov, New York, NY (US); Jessica Zoob, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 676 days.

(21) Appl. No.: 09/662,463

(22) Filed: Sep. 15, 2000

(51) Int. Cl.
*G06Q 99/00* (2006.01)

(52) U.S. Cl. ........................................................ 705/1
(58) Field of Classification Search ................... 705/1
See application file for complete search history.

(56) References Cited

U.S. PATENT DOCUMENTS

| | | | |
|---|---|---|---|
| 5,422,809 A * | 6/1995 | Griffin et al. ................... | 705/5 |
| 5,555,298 A * | 9/1996 | Jonsson .................. | 379/210.01 |
| 5,722,418 A * | 3/1998 | Bro ........................... | 600/545 |
| 5,862,223 A * | 1/1999 | Walker et al. ................. | 705/50 |
| 5,884,272 A * | 3/1999 | Walker et al. ................. | 705/1 |
| 5,948,040 A * | 9/1999 | DeLorme et al. ........... | 701/201 |
| 5,991,735 A * | 11/1999 | Gerace ........................ | 705/10 |
| 6,026,148 A * | 2/2000 | Dworkin et al. ......... | 379/88.18 |
| 6,029,141 A * | 2/2000 | Bezos et al. .................. | 705/27 |
| 6,064,978 A * | 5/2000 | Gardner et al. ............... | 705/10 |
| 6,223,165 B1 * | 4/2001 | Lauffer ......................... | 705/8 |

FOREIGN PATENT DOCUMENTS

| | | | |
|---|---|---|---|
| WO | WO 0120518 A1 * | 3/2001 | |
| WO | WO 0167203 A2 * | 9/2001 | |

OTHER PUBLICATIONS

Cho, Wonae; Sumichrast, Robert T.; Olsen Michael D., "Expert-system technology for hotels: concierge application." Cornell Hotel & Restaurant Administration Quarterly, v37, n1, p. 54(7), Feb. 1996.*
"Click-And-Go: Options For Online Wanderlust," InternetWeek, p. 14, Sep. 15, 1997.*
Willmott, Don, "Ask an Expert." PC Magazine, Apr. 18, 2000.*

* cited by examiner

*Primary Examiner*—Jonathan Ouellette
(74) *Attorney, Agent, or Firm*—Snell & Wilmer L.L.P.

(57) ABSTRACT

Systems, methods and computer program products enabling customers to communicate requests to travel experts located in a cities around the globe. A particular customer's request is received by one or more experts located in a city to which the consumer has expressed interest in travelling. The one or more experts respond to the customer request by providing the customer information or offering to help the customer with travel arrangements. Because the experts are located in travel destinations the experts have special knowledge regarding travel inquiries related to the city to which the customer wishes to travel. Communication between the customers and experts may be facilitated, coordinated and monitored through the use of a destination expert server in communication with the customers and experts via the Internet.

26 Claims, 4 Drawing Sheets

SYSTEMS, METHODS AND COMPUTER PROGRAM PRODUCTS FOR RECEIVING AND RESPONDING TO CUSTOMER REQUESTS FOR TRAVEL RELATED INFORMATION

FIELD OF THE INVENTION

The present invention generally relates to travel services, and more particularly, to systems, methods and computer program products enabling customers to receive travel related information.

BACKGROUND OF THE INVENTION

The number of consumers accessing the Internet has increased dramatically over the past few years, and will continue to do so, as the ease, availability and speed of the Internet continues to improve. As a result, the Internet has become an important business and consumer tool facilitating the distribution of information and the exchange of services and business. One type of business which has been available on the Internet in recent years are businesses relating to travel services. Airlines, rental car companies, travel agents, and the like have established Internet web sites, through which information can be obtained regarding travel arrangements. Through many of these websites, booking or travel reservations can be placed. For instance, a consumer wishing to fly to a particular city can make flight reservations directly via an Internet web site. Such services are very convenient for both the business and recreational traveler, who can quickly make affordable travel arrangements with a minimum of effort.

A shortcoming of conventional Internet travel services sites, however, is the inability of travelers to obtain information about a prospective travel destination interactively when lack of personal contact with travel experts coupled with the convenience of booking reservations via the Internet. For instance, many travel sites offer consumers the ability to book arrangements, though the traveler must have done all their research and decided on the specific details of their trip before going to the travel sit to book their travel arrangements without offering access to travel experts who can answer specific questions regarding travel to a particular city. Furthermore, other Internet sites, which offer travel related advice, do not necessarily offer specialized knowledge regarding travel to a particular travel destination. Even more, such sites do not enable consumers to interactively obtain information about a particular travel destination.

Therefore, what is needed are systems, methods and computer program products that enable consumers to easily and efficiently obtain travel related information and book travel arrangements.

SUMMARY OF THE INVENTION

The present invention comprises systems, methods and computer program products that enable customers to request information from travel experts based in a particular destination to which customers wish to travel. The travel expert in the destination city can provide information and answers to customer questions relating to the destination, including answering or providing information with respect to events, transportation, tourist information and other information useful to a potential visitor to that destination. In addition to answering questions, the expert may offer to book travel arrangements for the customer. Because the expert is located in the destination city to which the customer is traveling, the expert may be able to access and book services not otherwise available to the customer via conventional travel agents or other travel services.

According to one embodiment of the invention, the system is established over a distributed computer network, such as the Internet, so that a consumer and expert can communicate freely across vast geographical boundaries with as few obstacles as possible. Additionally, according to one aspect of the invention, the customer and expert can utilize electronic mail (E-mail) to communicate. Access to experts located in a destination city is particularly advantageous because a consumer can exploit the knowledge of an expert familiar with a destination city, rather than using a locally based travel agent who may have never even been to the destination city. In addition to arranging and reserving hotels, rental cars, and conventional travel related bookings, the destination expert can also book arrangements for hotels, restaurants, special events, or the like, which the destination expert has special knowledge of. For instance, the customer may inform the expert that the customer enjoys attending the theatre. The expert may have special knowledge of theatre events occurring at the destination city, where tickets are only available at a specific ticket or box office local to the expert. Because the expert is located in the destination city in which the tickets are sold, the expert may be able to easily locate and obtain the tickets for the customer, who communicates with the expert using the system and apparatus of the present invention. These tickets may be unknown to, or unobtainable by, conventional travel agents not familiar with, or located in, the destination city.

It will be appreciated that although conventional travel agents might be able to arrange some of the travel arrangements that locally situated experts arrange, conventional travel agents cannot offer the same level of service nor the same speed of service as the present invention. Furthermore, conventional travel agents do not allow customers to effortlessly communicate with persons located in a distant city of travel. For example, where a customer utilizes a conventional travel agent, the travel agent may not be aware of special offers or events at the customer's travel destination city, so that the customer may not be adequately or best informed regarding events and travel related services when travelling to the destination city. Furthermore, where a local travel agent is aware of an event or service which may be booked by an individual, in many circumstances a local travel agent's only recourse is an attempt to contact local affiliates familiar with the destination city, who may be able to obtain more detailed information on the event or service. This may result in unnecessary changes to the travelers and may delay the reservation process.

Another limitation of conventional travel agents is that they may have few, if any, contacts in the destination city. It will be appreciated that not all, or even possibly no travel agents, have the ability to contact affiliates with detailed knowledge of cities and events occurring around the globe. Additionally, the process of using conventional travel agents is not seamless and automated. For instance, a consumer may have to make multiple telephone calls to a travel agent, who may in turn act as a middle man regarding booking arrangements in distant cities. In fact, the customer may have to deal with multiple booking agents, each with an incentive to charge a fee for their service. Therefore, it will be appreciated that the present invention offers a number of advantages over conventional travel agents, in similar travel related internet services.

According to one embodiment of the invention, a method performed by a destination expert server includes communicating with a customer over a computer network, wherein communicating with the customer includes receiving contact information from the customer, identifying a plurality of experts, wherein the plurality of experts are in selective communication with the destination expert server, and receiving, from the customer, a request relating to a destination city to which the customer is interested in travelling. The method further includes determining a destination expert of the plurality of experts, wherein the destination expert has particular knowledge about the destination city, and forwarding the customer's request and the customer's contact information to the destination expert, such that the destination expert can communicate with the customer to provide a response to the customer request.

According to one aspect of the invention, determining a destination expert includes determining a destination expert of the plurality of experts, wherein the destination expert is located in the destination city. According to another aspect of the invention, communicating with the customer over the computer network includes receiving a credit card number from the customer. Furthermore, the destination expert response can include an offer to book reservations relating to the customer request, and the destination expert server can receive the destination expert response from the destination expert and forward the destination expert response to the customer.

According to yet another aspect of the present invention, the destination expert server facilitates transactions with customers, wherein the transactions relate to customer requests. Furthermore, the destination expert server can monitor communications made by the customers and experts using the destination expert server.

According to another embodiment of the present invention, there is disclosed a system for accepting and responding to a customer request for information relating to a destination city. The system includes a destination expert server, a customer in communication with the destination expert server, wherein the customer submits a request to the destination expert server for information relating to the destination city, and a plurality of experts in selective communication with the destination expert server, wherein the destination expert server forwards the customer request to a destination expert of the plurality of experts, and wherein the destination expert has particular knowledge about the destination city, such that the destination expert can communicate with the customer to provide a response to the customer request.

According to one aspect of the invention, the customer provides the destination expert server with customer contact information, wherein the customer contact information is forwarded by the destination expert server to the destination expert. Furthermore, the destination expert can be located in the destination city, and accessible to the customer via the internet. The plurality of experts may also be in selective communication with the destination expert server via electronic mail.

According to another embodiment of the invention, there is disclosed a computer-readable storage medium encoded with processing instructions for implementing a method performed by a destination expert server. The processing instructions can direct a computer to perform the steps of: communicating with a customer over a computer network, wherein communicating with the customer includes receiving contact information from the customer, identifying a plurality of experts, wherein the plurality of experts are in selective communication with the destination expert server, receiving, from the customer, a request relating to a destination city to which the customer is interested in travelling, determining a destination expert of the plurality of experts, wherein the destination expert has particular knowledge about the destination city, and forwarding the customer's request and the customer's contact information to the destination expert, such that the destination expert can communicate to the customer a response to the customer request.

According to one aspect of the invention, the processing instructions direct the computer to perform the step of determining a destination expert of the plurality of experts, wherein the destination expert is located in the destination city. According to another aspect of the invention, the processing instructions direct the computer to perform the step of communicating with the customer over the computer network, wherein communicating with the customer over the computer network includes receiving a credit card number from the customer. According to yet another aspect of the present invention, the processing instructions direct the computer to perform the step of forwarding the customer's request and the customer's contact information to the destination expert, such that the destination expert can communicate to the customer a response to the customer request, and wherein the destination expert response includes an offer to book reservations relating to the customer request. Furthermore, the processing instructions can direct the computer to perform the steps of receiving the destination expert response from the destination expert and forwarding the destination expert response to the customer, and the steps of facilitating and monitoring transactions with the customer, wherein the transaction relates to the customer request.

According to yet another embodiment of the present invention, there is disclosed a device enabling customers access to experts located in cities to which the customers may wish to travel, where the experts can answer customer questions and book travel arrangements for the customers. The device includes a processor, a storage device in communication with the processor via a system bus, and a memory connected to the processor, the memory including an operating system for controlling the operation of said processor, and a destination expert control module. The processor is operative with the destination expert control module to communicate with a customer over a computer network, wherein communicating with the customer includes receiving contact information from the customer, identify a plurality of experts, wherein the plurality of experts are in selective communication with the destination expert server, and receive, from the customer, a request relating to a destination city to which the customer is interested in travelling. The processor is further operative with the destination expert control module to determine a destination expert of the plurality of experts, wherein the destination expert is located in the destination city, and forward the customer's request and the customer's contact information to the destination expert, such that the destination expert can communicate with the customer to provide a response to the customer request.

According to one aspect of the invention, communicating with the customer over the computer network includes receiving a credit card number from the customer. According to another aspect of the invention, the destination expert response includes an offer to book reservations relating to the customer request. Further, according to yet another aspect of the invention, the processor is operative with the destination expert control module to receive the destination expert response from the destination expert and forward the destination expert response to the customer. Finally, the processor may be further operative with the destination expert control module to facilitate a transaction with the customer, wherein the transaction relates to the customer request, and to monitor communications of the destination expert server.

DETAILED DESCRIPTION OF THE INVENTION

Figure 1:
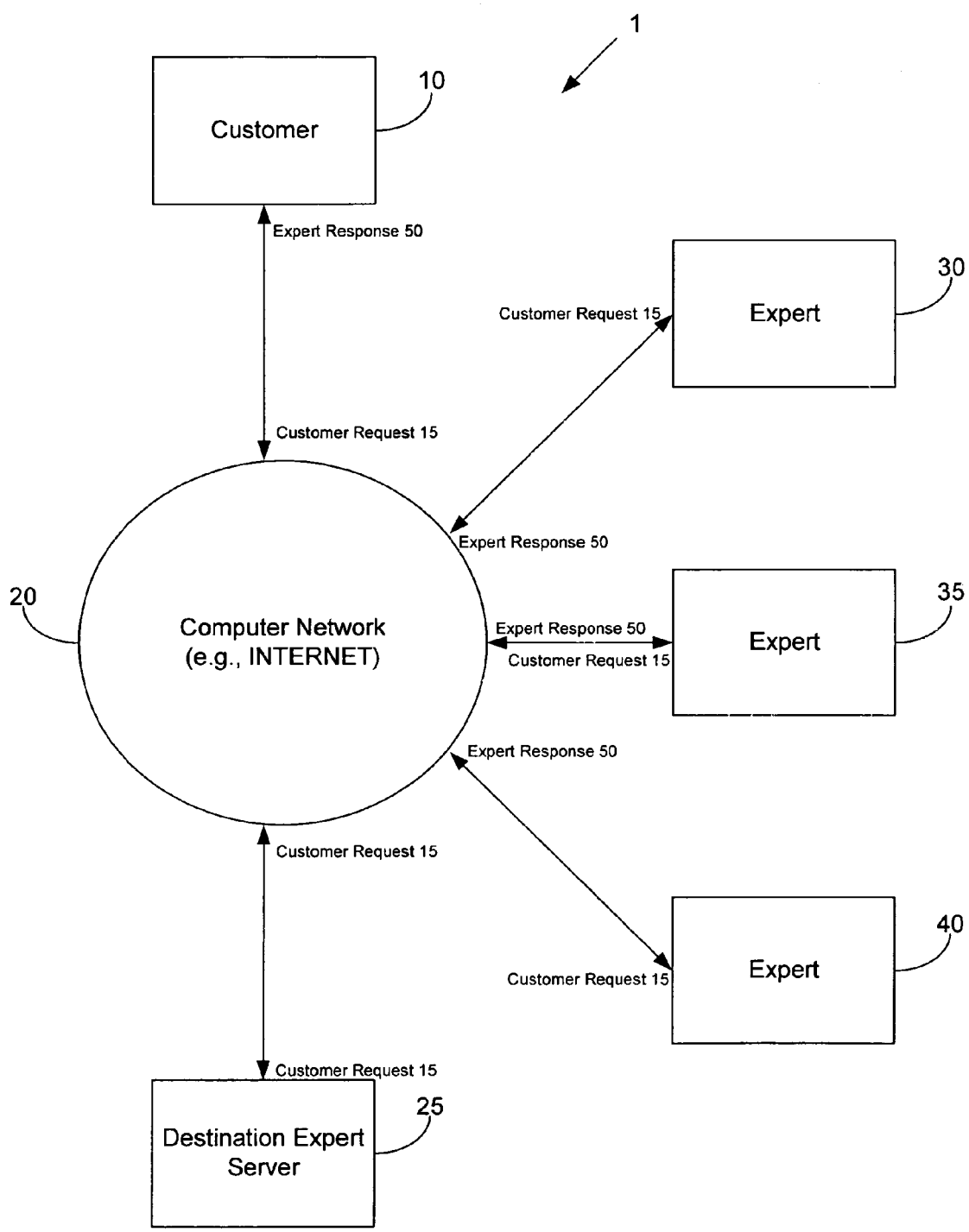
FIG. 1 is a schematic block diagram of a system that enables customers to request information from experts located in travel destinations, in accordance with one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of ordinary skill in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention is described below with reference to block diagrams and flowchart illustrations of methods, apparatus (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

FIG. 1 shows a block diagram of a travel information system 8 in accordance with an embodiment of the present invention. The travel information system 8 includes a customer 10, a computer network 20, one or more destination expert servers 25, and a plurality of experts 30, 35, 40. The experts 30, 35, 40 represent experts located in different destination cities to which the customer may wish to travel. As can be appreciated by one of ordinary skill in the art, the computer network 20 facilitates communication between the customer 10, destination expert 25, and experts 30, 35, 40. The communication links between each of the parties illustrated in the system of FIG. 1 are preferably implemented through one or more communication networks such as a private extranet, a public Internet, though it will be recognized that other networks such as a public switch telephone network (PSTN) may likewise be utilized. In a preferred embodiment, as shown in FIG. 1, the communication links are implemented via the Internet using Internet protocol (IP). Furthermore, the destination expert server 25 and experts 30, 35, 40 are preferably accessed by the customer 10 via a desktop computer including a web browser application which may or may not have encryption capability.

In accordance with the present invention, when a customer 10 seeks information and/or booking services from one or more of the experts 30, 35, 40 located in a particular destination city, the customer 10 accesses the destination expert server 25 through the computer network 20. As will be explained in further detail below, the destination expert server 25 initiates the link between the customer 10 and one the experts 30, 35, 40, so that the customer and expert can communicate. The destination expert server 25 may be accessed via a homepage on the Internet, according to one aspect of the invention, such that the customer 10 can access the destination expert server 25 via a conventional computer and web browser. Alternatively, the destination expert server 25 may be local to the customer 10, such that the customer has a direct link to the destination expert server 25 via an input device or local link. For example, the destination expert server 25 can be connected to a local area network to which the customer 10 is also connected, or the destination expert server 25 and customer 10 can be configured as a kiosk.

Optionally, upon accessing the destination expert server 25, the customer 10 may be required to input customer identification information such that the customer 10 is authorized to utilize the services of the destination expert server 25. In addition to identification information, the customer 10 may be required to input a payment identifier, such as credit card number, where the destination expert server 25 charges a transactional fee for the customer's use of experts 30, 35, 40 or services offered by the experts 30, 35, 40. Where customers are charged for using the system 8, the destination expert server 25 may include a customer file which stores customer 10 information, such that customers can be authenticated upon accessing the destination expert server 25. According to one aspect of the invention, if services are utilized by the customer 10, payment for the use of the system 8 may be deducted directly from the customer's credit card, as is well known in conventional Internet transactions.

Upon accessing the destination expert server 25, or upon authenticating or providing the destination expert server 25 with the appropriate customer information, the customer 10 is presented with a web page or graphical user interface (GUI), through which the customer 10 can select a city to which the customer intends to travel (hereinafter referred to as the destination city). The city selection may be presented to the customer using any well known means in the art, including, but not limited to pull-down menus, lists, or the like. According to one aspect of the invention, the customer 10 may type out the destination city. Additionally, the customer may be presented an interactive map or tree type menu to facilitate the selection of a destination city. The customer 10 can choose or input a city using an input device, such as a keyboard or a mouse. According to one aspect of the invention, only after the customer 10 selects a destination city the customer is presented with a text or similar input box in which to type a request 15, which can include one or more questions and/or booking inquiries. The text box may be located on the same page as the city selection, or may be on a separate web page or GUI to which the customer 10 has been directed. Alternatively, the destination city selection and text box are on the same web page and the customer 10 may complete the city selection and request in any order, such that the customer 10 can first enter a request 15 and thereafter select the destination city, or vice versa. Regardless of the manner in which this information is input, customers submit the request 15 and destination city to the destination expert server 25 by selecting or clicking on a submit button, link, or the like.

The destination expert server 25 receives the customer's request 15 and processes the request. The processing of the request is explained in detail with reference to FIG. 2. The destination expert server 25 then forwards the customer's request to one or more of the experts 30, 35 and 40 located in the destination city selected by the customer 10. The experts are preferably persons confirmed by the destination expert server, an administrator of the destination expert server or a third party entity to have sufficient knowledge regarding at least one city. According to one aspect of the invention the experts may be travel agents located in cities around the world.

According to one embodiment of the present invention, although there may be multiple experts located within each destination city, only one expert, as determined by the destination expert server 25, may receive the customer's request 15. According to another aspect of the invention, the destination expert server 25 can forward the customer request 15 to multiple experts located at the destination city. Additionally, the destination expert server can forward the request 15 to a server at the destination city, in communication with one or more experts such that the server determines the expert to which the request is forwarded, or enables the one or more experts at that destination to selectively respond to the request. Upon receiving the customer's request 15, the expert can respond 50 to the customer 10. The expert response can include an answer to a question posed by the customer's request 15, and/or a proposal to help the customer 10 with booking information related to a customer inquiry contained within the customer's request 15. The expert response 50 may be forwarded to the destination expert server 25 before being forwarded on to the customer 10 such that the destination expert server 25 can maintain or store the expert's response 50 and run additional utilities on the system 8, as will be explained in detail below.

Figure 2:
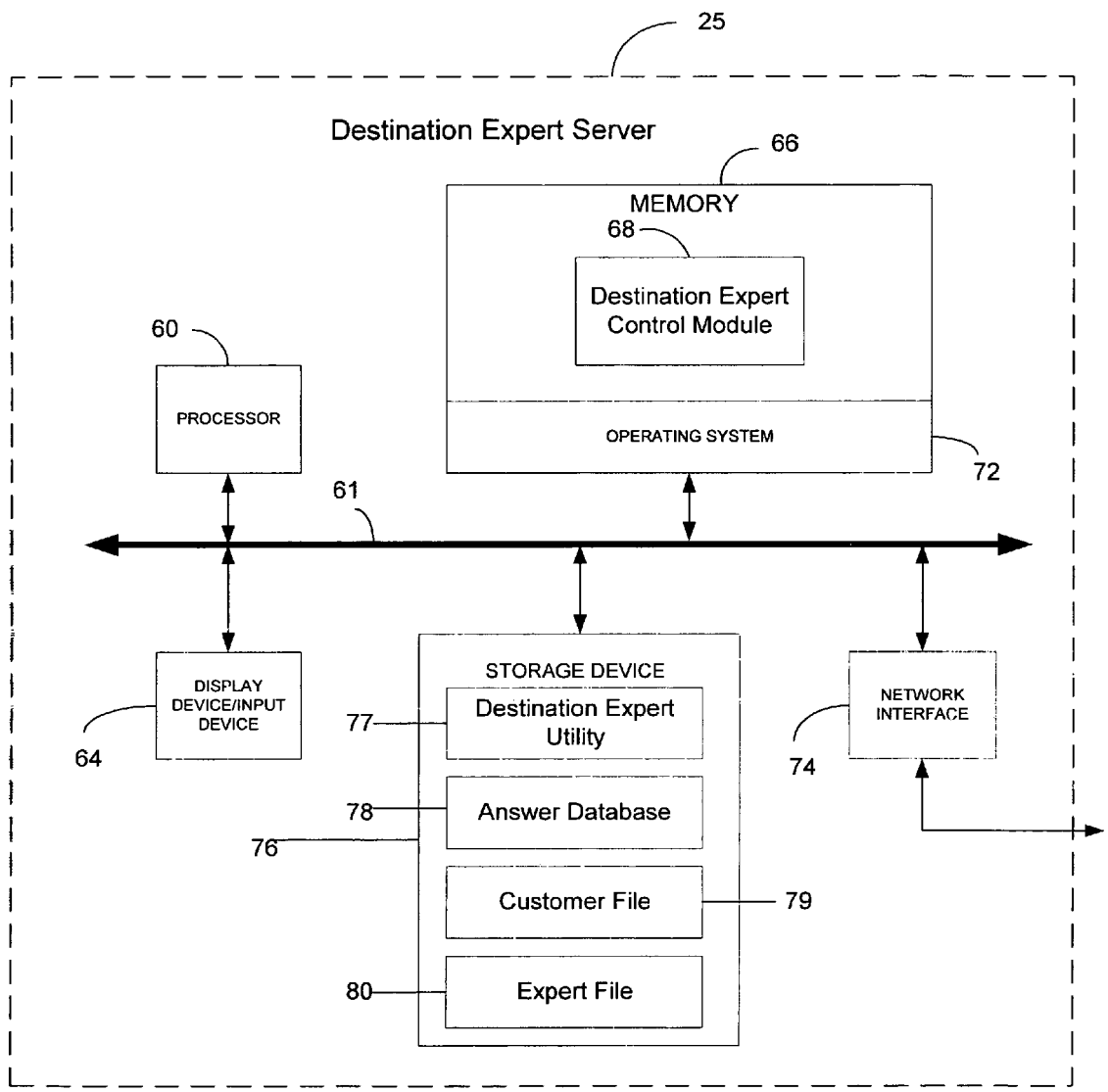
FIG. 2 is a block diagram of a destination expert server, according to one aspect of the present invention.

FIG. 2 shows a block diagram of the destination expert server 25 of FIG. 1, in accordance with an embodiment of the present invention. The destination expert server 25 includes a processor 60 that communicates with other elements within the server 25 via a system interface or bus 61. Also included in the destination expert server 25 is a display device/input device 64, for example, a keyboard or pointing device in combination with a monitor, for receiving and outputting data to a customer. Memory 66 is located within the destination expert server 25 and includes a destination expert control module 68, which controls the operation of the destination expert server 25 as described herein with the assistance of the processor 60 and an operating system 72. The operating system 72 enables execution of the destination expert control module 68 by the processor 60. Also located within the destination expert server 25 is a network interface 74, for interfacing and communicating with other elements of a computer network. Lastly, the destination expert server 25 includes a storage device 76, such as a hard disk drive, which contains files that are utilized by the destination expert control module 68, as explained in detail below. It will be appreciated by one of ordinary skill in the art that one or more of the destination expert server 25 components may be located geographically remotely from other destination expert server 25 components. Furthermore, one or more of the components may be combined, and additional components performing functions described herein may be included in the destination expert server 25.

More specifically, located within the storage device 76 is a destination expert utility 77, which monitors the function of the destination expert server 25. The destination expert utility 77 can track and store the number of customer requests received, the number of customer requests answered, the average time to respond to customer requests, and additional information which may be useful to a destination expert server administrator in monitoring the function and usage of the destination expert server 25 and system 8. For instance, the destination expert utility can determine the destination city to which the most customer requests are forwarded. This information may be used by the destination expert server 25 or an administrator of the server to tailor advertisements placed on the GUI, or to administer the system, such as identifying the need for additional experts in a specific city. Also located within the storage device 76 is an answer database 78, which can store answers to common questions asked by customers, such that experts are not necessarily required to answer the same question multiple times. According to one aspect of the invention, the destination expert server 25 can receive customer requests, scan the customer requests, and automatically respond to the requests where the request includes questions having corresponding answers stored within the answer database 78. The answer database 78 may be updated periodically by a destination expert server administrator, by an expert in communication with the destination expert server, or automatically after the question has been repeated a specific umber of times.

The storage device 76 can also contain a customer file 79 which stores information relating to customers registered with the destination expert server 25, such as the customer's identity, contact information, and/or credit card number. It should be appreciated that the customer information records may be additionally or alternatively located within the memory 66, or may be located external to the destination expert server 25. Finally, the storage device 76 also includes an expert file 80 for storing information regarding the identity and location of experts. This information is accessed to identify experts and establish expert locations such that requests and questions can be forwarded to an expert at the destination location.

Figure 3:
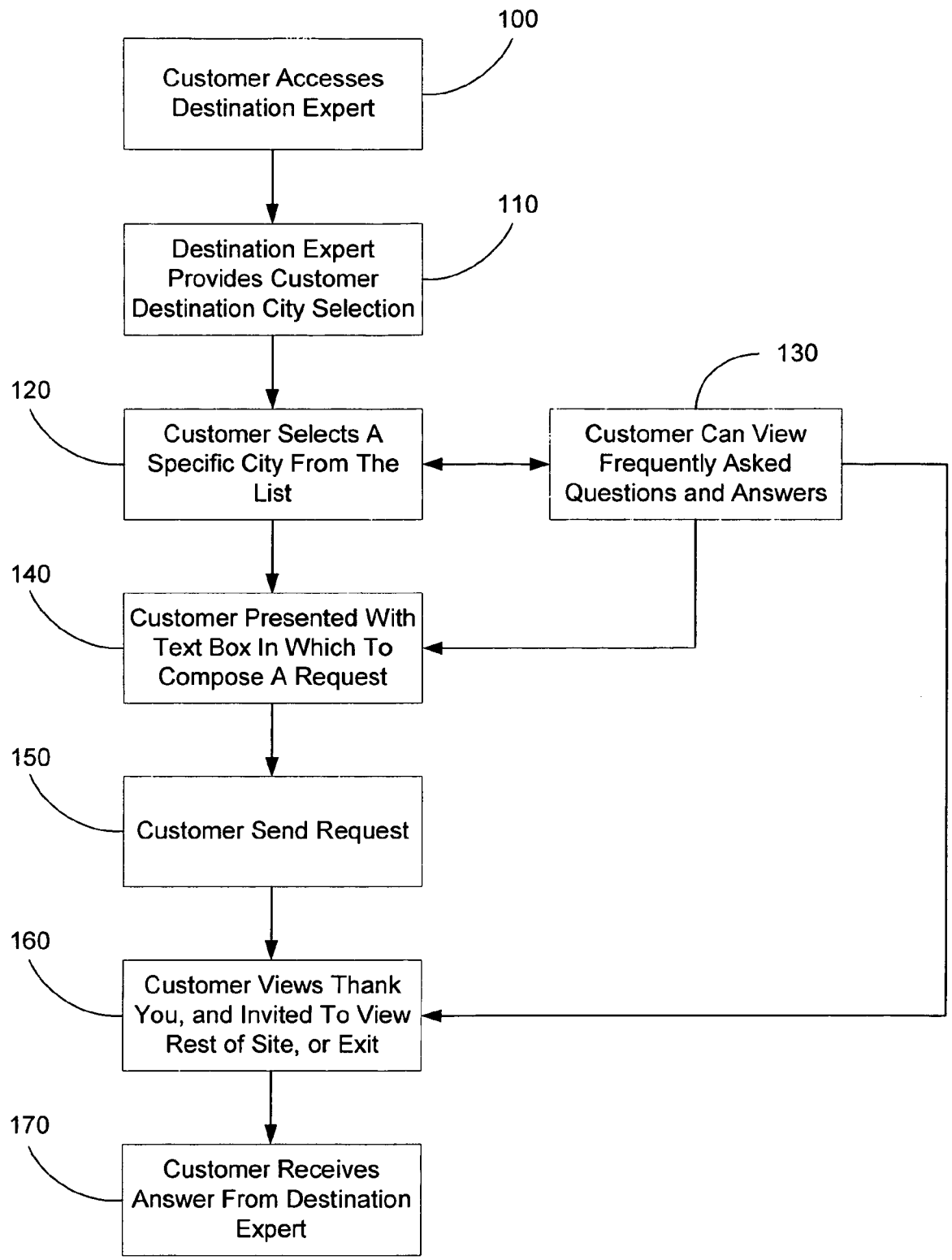
FIG. 3 is a customer process flow diagram representing the operation of an embodiment of the present invention.
Figure 4:
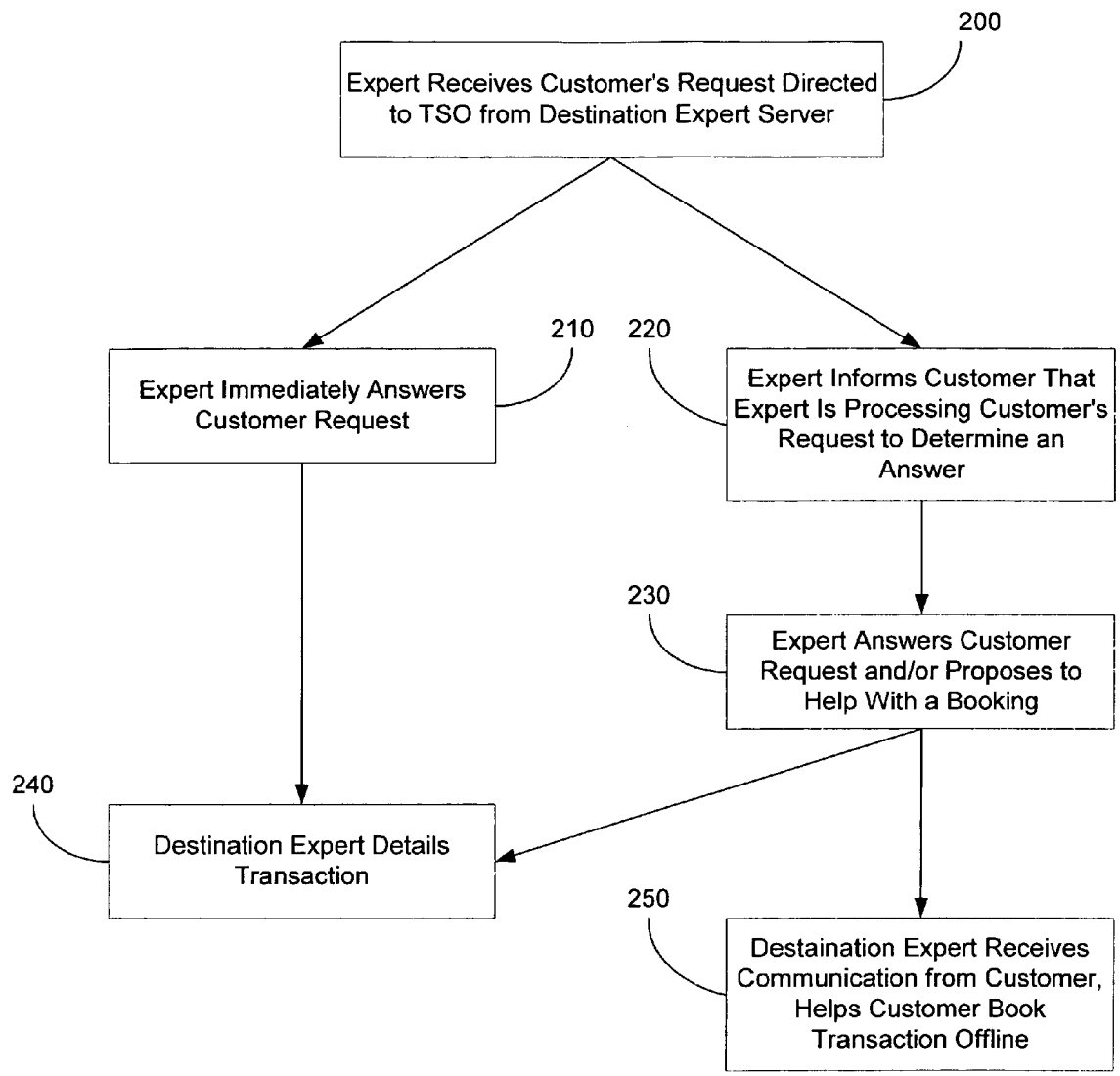
FIG. 4 is an expert process flow diagram of the operation of an embodiment of the present invention.

FIGS. 3 and 4 illustrate a process flow and operation of the system 8 illustrated in FIG. 1 and the destination expert server 25, according to an embodiment of the present invention. It should be appreciated that the flowcharts describe below with respect to FIGS. 3 and 4 are for illustrative purposes, and are not intended to limit the scope of the invention as described herein. FIG. 3 illustrates a customer flow diagram representing the customer process flow of a customer accessing the system and destination expert server 25 of the present invention. First, a customer accesses the destination expert 100 via a computer network, such as the Internet, or through a direct or local connection to the destination expert server 25, as described above. Thus, the customer 10 can access the destination expert server 25 via a personal computer having thereon a conventional web browser, or the customer 10 may directly access the destination expert server 25 via a display or input device on the server 25, such as a kiosk configuration. Upon accessing the destination expert server 25 the customer 10 is presented with a graphical user interface, such as a web page, which provides the customer 10 with a list of destination cities or with one or more selection or search tools that facilitate the selection of a destination city.

The destination expert server 25 may require the customer to input information such as customer's identity, contact information (e.g., E-mail address), and credit card number, prior to providing the customer access or a list of destination cities where a customer must be authorized to access or use the destination expert server 25, the destination expert server 25 may present a graphical user interface through which the customer can input such information. The information may be compared to information stored in the customer file 79 so that the customer 10 can be authenticated. The comparison may be executed by the processor 60 working in conjunction with the operating system 72. Where the customer has not previously been authorized access to the destination expert server 25 the processor 60 can register the customer and store the customer's information in the customer file 79, as is well known in the art.

The destination cities and graphical user interface may be stored within the storage device 76 or the memory 66 and are accessible by the destination expert control module 68 operating in conjunction with the processor 60 and operating system 72, such that they may be displayed to the customer via a local display device or through the network interface 74 in communication with the customer's computer. After the customer is presented with a list of destination cities at step 110, the customer can select a specific city at step 120. As previously stated, this may occur through any conventional input device, such as through a mouse or keyboard, and may be accomplished through the use of a pull-down menu or selection buttons provided on a web page presented by the destination expert server 25. Upon selecting a specific destination city at step 120, the customer can view frequently asked questions and corresponding answers regarding a particular city at step 130, or, alternatively, can compose a request to an expert using a text box presented to the customer at step 140. The customer process flow is controlled by the destination expert control module 68 in combination with the operating system 72 and processor 60, which are in communication via the system bus 61 illustrated in FIG. 2.

Where the customer chooses to view frequently asked questions and answers at step 130, a web page, or similar interface, is presented to the user and includes previously stored answers to frequently asked questions. Both the frequently asked questions and answers preferably are stored within the storage device 76 and accessible by the destination expert control module 68 in response to the customer's request to view the frequently asked questions and answers at step 130. After the customer views the frequently asked questions and answers 130, the customer may be presented with a textbox in which to compose a request to an expert at step 140, may be invited to view additional information provided by the destination expert server at step 160, or may exit the website or network interface at step 160. As stated above, the customer may be presented with the textbox in which to compose a request at step 140 after selecting a specific city at step 120 or viewing frequently asked questions and answers at step 130. This textbox may be implemented by any well known means in the art. Using the textbox, the customer can compose a request to an expert located in the destination city the customer previously selected.

The customer request can include virtually anything relating to the destination city to which the customer is traveling. For instance, the customer can request information on hotels, rental cars, tourist attractions, shows or events, and any other items of interest the customer may wish to obtain more information about. The customer's request may not be limited to questions. For example, the customer may request that the expert book a hotel reservation for the customer. The customer may include a credit card number such that the expert can reserve a hotel room, or the expert may access the customer's credit card number where it is stored in a customer file 79 within the destination expert server 25. After the customer sends the request at step 150 to the destination expert server 25 via a submit or enter button or key, the customer views a thank you response forwarded to the customer by the destination expert server 25 and may be invited to view additional information located on the destination expert server 25, or exit. A thank you message may be transmitted to the customer over the customer's browser, or maybe electronically mailed to the customer. After the customer has completed and sent the request to the destination expert server 25, customer will receive an answer from the destination expert at step 170. This answer may come directly from an expert located in the destination to which customer is traveling. Furthermore, according to one embodiment of the invention, the answer may come directly from the destination expert server 25, and more particularly, from the answer database 78. According to this embodiment, the destination expert control module 68 can review the customer's request for information, and determine the appropriate answer to fulfill the customer's request. This may be fully automated such that experts are not required to respond to the customer in every instance. According to one aspect of the invention the experts can respond to requests by using previously stored answers, such as these stored in the answer database. The experts can either select the answers automatically, or can cut and paste the answers into a response. Furthermore, the process may also be automated by the destination expert server 25 where a customer requests to make arrangements which can be accomplished by a fully automated system.

FIG. 4 shows the process flow and operation of the system of the present invention in response to a customer-input request, including steps taken by an expert receiving a customer request. It should be appreciated that the request may be received by the expert at a travel service office (TSO) at which the expert is located. Alternatively, the request may be received at any other location from which the expert can communicate with the destination expert server 25. According to one aspect of the present invention, the destination expert server 25 forwards the customer request to a specific expert or TSO by identifying the expert or TSO as being associated with a particular destination location selected by the customer 10 via a graphical user interface, as explained in detail above. More specifically, the destination expert server 25 receives the destination city entered by the customer 10, and retrieves the expert file 80 located in the storage device 76 to determine an expert or TSO located in that particular destination city. Located within the expert file 80 is contact information for the TSO or expert, through which the expert may be contacted. The contact information can include e-mail, telephone number, fax number, web address, or other contact information to which the customer request may be forwarded by the destination expert server 25.

After receiving the customer's request forwarded from the destination expert server 25 to the expert directly or via a TSO at step 200, the expert can either immediately answer the customer request at step 210 or inform the customer 10 that the expert is processing the customer's request to determine an answer at step 220. Therefore, the expert may immediately answer the customer's request where the expert has an immediate response without requiring further research. For instance, where a customer's request includes an inquiry concerning hotel rates at the destination city, the expert may immediately respond with rates, where they are immediately available to the expert. On the other hand, where the expert does not have an immediate answer to the request, the expert may inform the customer at step 220 that the customer's request is being processed to determine a response. In many circumstances, this may occur where the customer 10 requests help with booking a reservation relating the customer's travel to the destination city. However, it will be appreciated that this can also occur where the customer asks a question which requires research by the expert. For example, a customer 10 may request information on the availability of theatre tickets to a particular play being presented at the destination city. The expert may initially inform the customer 10 that the expert is processing the customer's request at step 220, after which the expert may determine the time and location of the play. In response to the customer's request, the expert can answer the request at step 230 and optionally, can propose to help the customer 10 with booking reservations relating to the customer's request. For instance, continuing with the above example, the expert can offer to reserve theatre tickets for the customer 10 in addition to informing the customer 10 of the location and time of the play. The expert can respond to the customer either directly or via the destination expert server 25. According to one aspect of the invention, the packet(s) of information transmitted to the expert, containing the customer request, contains contact information for the customer generating the request. For instance, along with the request the expert may also receive the customer's E-mail address. Therefore, the expert can respond to the customer directly. According to another aspect of the invention, the expert may receive additional customer contact information, such as a customer telephone number, so that the expert can respond to the customer request offline. The expert can also respond to the customer using live text chat, voice over IP to communication, or the like, or can arrange a time to communicate with the user at a later date.

According to another embodiment of the invention, the expert can receive and respond to a request with the aid of the destination expert server 25 such that the expert is not aware of the identity of the customer. This can occur where the destination expert server 25 forwards the request to an expert along with a customer identifier. In responding to the request, the expert's response and client identifier can be received by the destination expert server, and matched against a stored list of customer names and linked client identifier such that the transaction can be anonymous to the expert. This information may be stored in the storage device 76. However, it will be appreciated by those of skill in the art that the expert may require the identity of the customer where the expert is booking reservations for the customer.

After the expert responds to the customer's request at step 220 by offering an answer or proposing a booking at step 230, the customer 10 can continue transacting with the expert or terminate the transaction. According to one aspect of the invention, the customer 10 can receive the expert's answer to the customer's request and can terminate the transaction with the system of the present invention. Alternatively, the customer can respond to an offer or proposal for booking by the destination expert. Like the expert's identification of the customer through reception of the customer's contact information, such as E-mail address, the customer can receive the expert's contact information with the expert's response. Therefore, the customer can respond to a proposal for booking by directly contacting the expert via contact information provided by the expert along with the expert's proposal for booking. According to one aspect of the invention, this contact information can include the expert's e-mail address, telephone number, or other contact information through which the customer 10 may communicate with the expert. According to another aspect of the invention, the customer may communicate with the destination expert via the destination expert server 25 to request assistance with booking.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for facilitating the distribution of travel-related information, comprising:

communicating with a customer over a computer network having a destination expert server, wherein the destination expert server includes an answer database;

determining a destination expert to which a plurality of requests from a plurality of customers are forwarded by the destination expert server, wherein the destination expert is knowledgeable of a particular destination;

presenting an offer related to the particular destination to the customer;

identifying a plurality of experts, wherein the plurality of experts are in selective communication with the destination expert server;

receiving, from the customer, a request comprising at least one of: customer data and destination question data, wherein the request is received by the destination expert server and, wherein the request is related to a desire of the customer to create travel plans;

associating the customer data with the destination question data and storing the association in the answer database, wherein said answer database includes a plurality of travel answers previously provided by said plurality of experts;

parsing the request to determine when the request includes destination question data;

determining whether the request is formatted to enable an automatic search of the answer database;

when the request is formatted to enable an automatic search of the answer database:

automatically retrieving an answer database response to the request from the answer database, wherein the retrieving step is performed automatically by said destination expert server without intervention by the destination expert and the customer, such that the answer database response includes a retrieved answer and a proposed itinerary;

when the request is not formatted to enable an automatic search of the answer database:

facilitating a selection, based on the request, of the destination expert from the plurality of experts, wherein the destination expert has particular knowledge about the destination city;

forwarding, by the destination expert server, the request to the destination expert to facilitate the destination expert to communicate with the customer to provide a response to the request;

sending the request to the destination expert to obtain a destination expert response including a proposed itinerary, wherein the proposed itinerary is based upon the particular knowledge of the destination expert related to the destination city, and wherein the destination expert response further includes an offer to book reservations for the proposed itinerary;

providing at least one of: the answer database response and the destination expert response to the customer;

enabling an interactive session between the destination expert and the customer to facilitate the destination expert interactively processing travel reservation requests from the customer.

2. The method of claim 1, wherein facilitating selection of a destination expert comprises selecting a destination expert from among the plurality of experts, wherein the destination expert is located in the destination city.

3. The method of claim 2, wherein communicating with the customer over the computer network includes receiving a credit card number from the customer.

4. The method of claim 1, further comprising receiving the destination expert response from the destination expert and forwarding the destination expert response to the customer.

5. The method of claim 1, further comprising monitoring communications of the destination expert server.

6. The method of claim 1, further including the step of transmitting the automatically retrieved answer to the customer.

7. The method of claim 1, wherein the customer is a new customer such that the destination expert server did not previously include new customer information, and the database relating to the subset of customers includes answers previously provided to pre-existing customers.

8. A system for accepting and responding to a customer request for travel information relating to a destination city, comprising:

a destination expert server configured to determine a destination expert to which a plurality of requests from a plurality of customers are forwarded by the destination expert server, wherein the destination expert is knowledgeable of a particular destination;

the destination expert server configured to presenting an offer related to the particular destination to the customer;

the destination expert server configured to receive a request comprising at least one of: customer data and destination question data from a customer for information relating to the destination city, to associate the customer data with the destination question data, and to store the association in the answer database;

the destination expert server configured to parse said request to determine when the request includes destination question data;

the destination expert server configured to determine whether the request is formatted to enable an automatic search of the answer database;

when the request is formatted to enable an automatic search of the answer database:

the destination expert server configured to automatically retrieve an answer database response to the request from the answer database, wherein the retrieving step is performed automatically by said destination expert server without intervention by the destination expert and the customer, such that the answer database response includes a retrieved answer and a proposed itinerary;

when the request is not formatted to enable an automatic search of the answer database:

the destination expert server configured to facilitate a selection, based on the request, of the destination expert from the plurality of experts, wherein the destination expert has particular knowledge about the destination city;

the destination expert server configured to forward the request to the destination expert to facilitate the destination expert to communicate with the customer to provide a response to the request;

the destination expert server configured to send the request to the destination expert to obtain a destination expert response including a proposed itinerary, wherein the proposed itinerary is based upon the particular knowledge of the destination expert related to the destination city, and wherein the destination expert response further includes an offer to book reservations for the proposed itinerary;

the destination expert server configured to provide at least one of: the answer database response and the destination expert response to the customer; and, wherein the destination expert server enables an interactive session between the destination expert and the customer to facilitate the destination expert interactively processing travel reservation requests from the customer.

9. The system of claim 8, wherein the customer provides the destination expert server with customer contact information, and wherein the customer contact information is forwarded by the destination expert server to the destination expert.

10. The system of claim 8, wherein the destination expert is located in the destination city.

11. The system of claim 8, wherein the destination expert server is accessible to the customer via the internet.

12. The system of claim 10, wherein the plurality of experts are in selective communication with the destination expert server via electronic mail.

13. A computer-readable storage medium encoded with processing instructions for implementing a method for facilitating the distribution of travel-related information, the processing instructions directing a computer to perform the steps of:
  communicating with a customer over a computer network having a destination expert server, wherein the destination expert server includes an answer database;
  determining a destination expert to which a plurality of requests from a plurality of customers are forwarded by the destination expert server, wherein the destination expert is knowledgeable of a particular destination;
  presenting an offer related to the particular destination to the customer;
  identifying a plurality of experts, wherein the plurality of experts are in selective communication with the destination expert server;
  receiving, from the customer, a request comprising at least one of: customer data and destination question data, wherein the request is received by the destination expert server and, wherein the request is related to a desire of the customer to create travel plans;
  associating the customer data with the destination question data and storing the association in the answer database, wherein said answer database includes a plurality of travel answers previously provided by said plurality of experts;
  parsing the request to determine when the request includes destination question data;
  determining whether the request is formatted to enable an automatic search of the answer database;
  when the request is formatted to enable an automatic search of the answer database:
    automatically retrieving an answer database response to the request from the answer database, wherein the retrieving step is performed automatically by said destination expert server without intervention by the destination expert and the customer, such that the answer database response includes a retrieved answer and a proposed itinerary;
  when the request is not formatted to enable an automatic search of the answer database:
    facilitating a selection, based on the request, of the destination expert from the plurality of experts, wherein the destination expert has particular knowledge about the destination city;
    forwarding, by the destination expert server, the request to the destination expert to facilitate the destination expert to communicate with the customer to provide a response to the request;
    sending the request to the destination expert to obtain a destination expert response including a proposed itinerary, wherein the proposed itinerary is based upon the particular knowledge of the destination expert related to the destination city, and wherein the destination expert response further includes an offer to book reservations for the proposed itinerary;
  providing at least one of: the answer database response and the destination expert response to the customer;
  enabling an interactive session between the destination expert and the customer to facilitate the destination expert interactively processing travel reservation requests from the customer.

14. The computer-readable storage medium of claim 13, wherein the processing instructions for directing a computer to perform the step of facilitating selection of a destination expert comprises processing instructions for directing the computer to perform the step of selecting a destination expert from among the plurality of experts, and wherein the destination expert is located in the destination city.

15. The computer-readable storage medium of claim 14, wherein the processing instructions for directing a computer to perform the step of communicating with the customer comprise processing instructions for directing a computer to perform the step of communicating with the customer over the computer network, wherein communicating with the customer over the computer network includes receiving a credit card number from the customer.

16. The computer-readable storage medium of claim 14, wherein the processing instructions further direct the computer to perform the step of receiving the destination expert response from the destination expert and forwarding the destination expert response to the customer.

17. The computer-readable storage medium of claim 14, wherein the processing instructions further direct the computer to perform the step of facilitating a transaction with the customer, wherein the transaction relates to the request.

18. The computer-readable storage medium of claim 14, wherein the processing instructions further direct the computer to perform the step of monitoring communications of the destination expert server.

19. The computer-readable storage medium of claim 13, wherein the processing instructions for directing a computer to perform further include the step of transmitting the automatically retrieved answer to the customer.

20. A device for enabling customers to access experts located in cities to which the customers may wish to travel, where the experts can answer customer questions and book travel arrangements for the customers, comprising:
  a processor;
  a storage device in communication with the processor via a system bus, wherein the storage device, and
  a memory connected to the processor, the memory including an operating system for storing a program to control the operation of the processor, and a destination expert control module,
  wherein the processor is operative with the destination expert control module to:
  communicate with a customer over a computer network having a destination expert server, wherein the destination expert server includes an answer database;
  determine a destination expert to which a plurality of requests from a plurality of customers are forwarded by the destination expert server, wherein the destination expert is knowledgeable of a particular destination;
  present an offer related to the particular destination to the customer;

identify a plurality of experts, wherein the plurality of experts are in selective communication with the destination expert server;

receive, from the customer, a request comprising at least one of: customer data and destination question data, wherein the request is received by the destination expert server and, wherein the request is related to a desire of the customer to create travel plans;

associate the customer data with the destination question data and storing the association in the answer database, wherein said answer database includes a plurality of travel answers previously provided by said plurality of experts;

parse the request to determine when the request includes destination question data;

determine whether the request is formatted to enable an automatic search of the answer database;

when the request is formatted to enable an automatic search of the answer database:
  automatically retrieve an answer database response to the request from the answer database, wherein the retrieving step is performed automatically by said destination expert server without intervention by the destination expert and the customer, such that the answer database response includes a retrieved answer and a proposed itinerary;

when the request is not formatted to enable an automatic search of the answer database:
  facilitate a selection, based on the request, of the destination expert from the plurality of experts, wherein the destination expert has particular knowledge about the destination city;
  forward, by the destination expert server, the request to the destination expert to facilitate the destination expert to communicate with the customer to provide a response to the request;
  send the request to the destination expert to obtain a destination expert response including a proposed itinerary, wherein the proposed itinerary is based upon the particular knowledge of the destination expert related to the destination city, and wherein the destination expert response further includes an offer to book reservations for the proposed itinerary;

provide at least one of: the answer database response and the destination expert response to the customer;

enable an interactive session between the destination expert and the customer to facilitate the destination expert interactively processing travel reservation requests from the customer.

21. The device of claim 20, wherein the identification of a plurality of experts comprises confirming that the destination expert is familiar with the destination city.

22. The device of claim 20, wherein communicating with the customer over the computer network includes receiving a credit card number from the customer.

23. The device of claim 20, wherein the processor is further operative with the destination expert control module to receiving the destination expert response from the destination expert and forward the destination expert response to the customer.

24. The method of claim 20, wherein the processor is further operative with the destination expert control module to facilitate a transaction with the customer, wherein the transaction relates to the request.

25. The method of claim 20, wherein the processor is further operative with the destination expert control module to monitor communications of the destination expert server.

26. The device of claim 20, wherein the processor is operative with the destination expert control module to transmit the automatically retrieved answer to the customer.

* * * * *